United States Patent [19]

Pierce, Jr.

[11] 4,014,223
[45] Mar. 29, 1977

[54] MULTIPLE RATIO HYDROKINETIC SPLIT TORQUE TRANSMISSION

[75] Inventor: Stanley L. Pierce, Jr., West Bloomfield, Mich.

[73] Assignee: Ford Motor Company, Dearborn, Mich.

[22] Filed: May 22, 1975

[21] Appl. No.: 580,072

[52] U.S. Cl. .................................. 74/688; 60/341
[51] Int. Cl.² .................. F16H 47/08; F16D 33/00
[58] Field of Search ................. 74/688, 687, 720; 60/347, 361, 364

[56] References Cited

UNITED STATES PATENTS

| | | | |
|---|---|---|---|
| 2,861,476 | 11/1958 | Russell | 74/677 |
| 3,491,617 | 1/1970 | Konrad | 74/688 |
| 3,494,223 | 2/1970 | Mori | 74/688 |
| 3,584,520 | 6/1971 | Borman | 74/688 |
| 3,722,323 | 3/1973 | Welch | 74/688 |
| 3,835,732 | 9/1974 | Mori | 74/688 |

Primary Examiner—William L. Freeh
Attorney, Agent, or Firm—Donald J. Harrington; Keith L. Zerschling

[57] ABSTRACT

A multiple ratio power transmission mechanism having planetary gear elements controlled by friction clutches and brakes and having two torque input gear elements, a hydrokinetic torque converter disposed in the torque delivery path for each input gear element and a torque splitting gear unit disposed between the torque input side of the hydrokinetic converter and the other of said torque input gear elements, wherein provision is made for selecting alternately one of the two torque input gear elements whereby the torque delivery path during operation in the higher speed ratios is partly mechanical and partly hydrokinetic and wherein the torque delivery path during operation in the lowest speed ratio is fully hydrokinetic.

8 Claims, 5 Drawing Figures

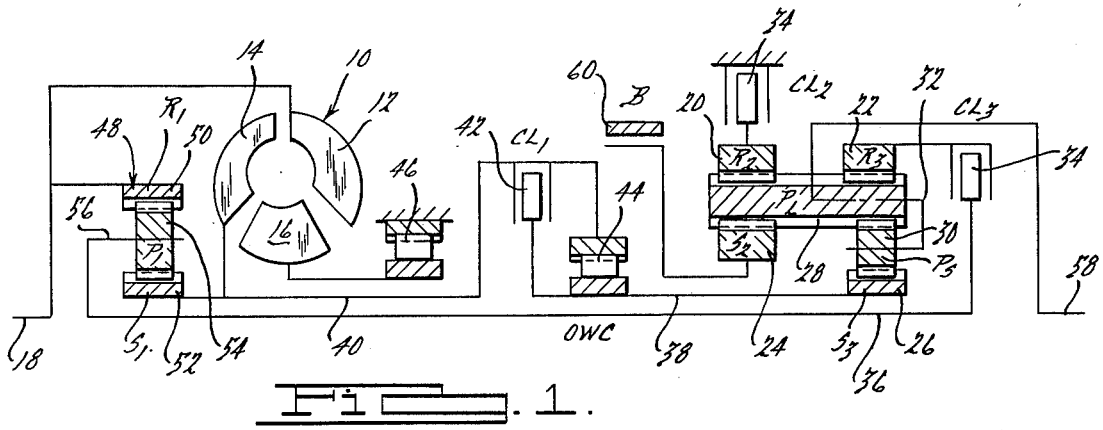
FIG. 1.
| Range | | B | CL₁ | CL₂ | CL₃ | OWC | Ratio | |
|---|---|---|---|---|---|---|---|---|
| 1 | M | X | X | | | | $1 + \frac{S_2}{S_1}$ | 2.40 |
|   | D | X | | | | X | | |
| 2 | | X | | | X | | $1 + \frac{S_2}{R_3}$ | 1.48 |
| 3 | | | X | | X | | 1.00 | 1.00 |
| R | | | X | X | | | $1 - \frac{R_2}{S_3}$ | 1.92 |
FIG. 2.
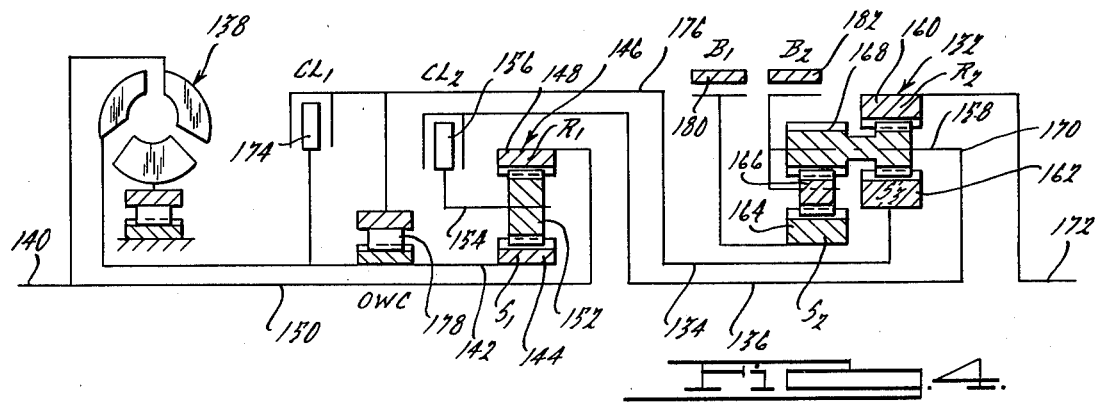
FIG. 4.
| Range | | B₁ | B₂ | CL₁ | CL₂ | OWC | Ratio | |
|---|---|---|---|---|---|---|---|---|
| 1 | M | X | | X | | | $\frac{R_2}{S_3} \cdot \frac{S_2 + S_3}{R_2 - S_2}$ | 3.14 |
|   | D | X | | | | X | | |
| 2 | | X | | | X | | $\frac{R_2}{R_2 - S_2}$ | 1.714 |
| 3 | | | | X | X | | 1.00 | 1.00 |
| R | | | X | X | | | $-\frac{R}{S_3}$ | -2.00 |
FIG. 4A.

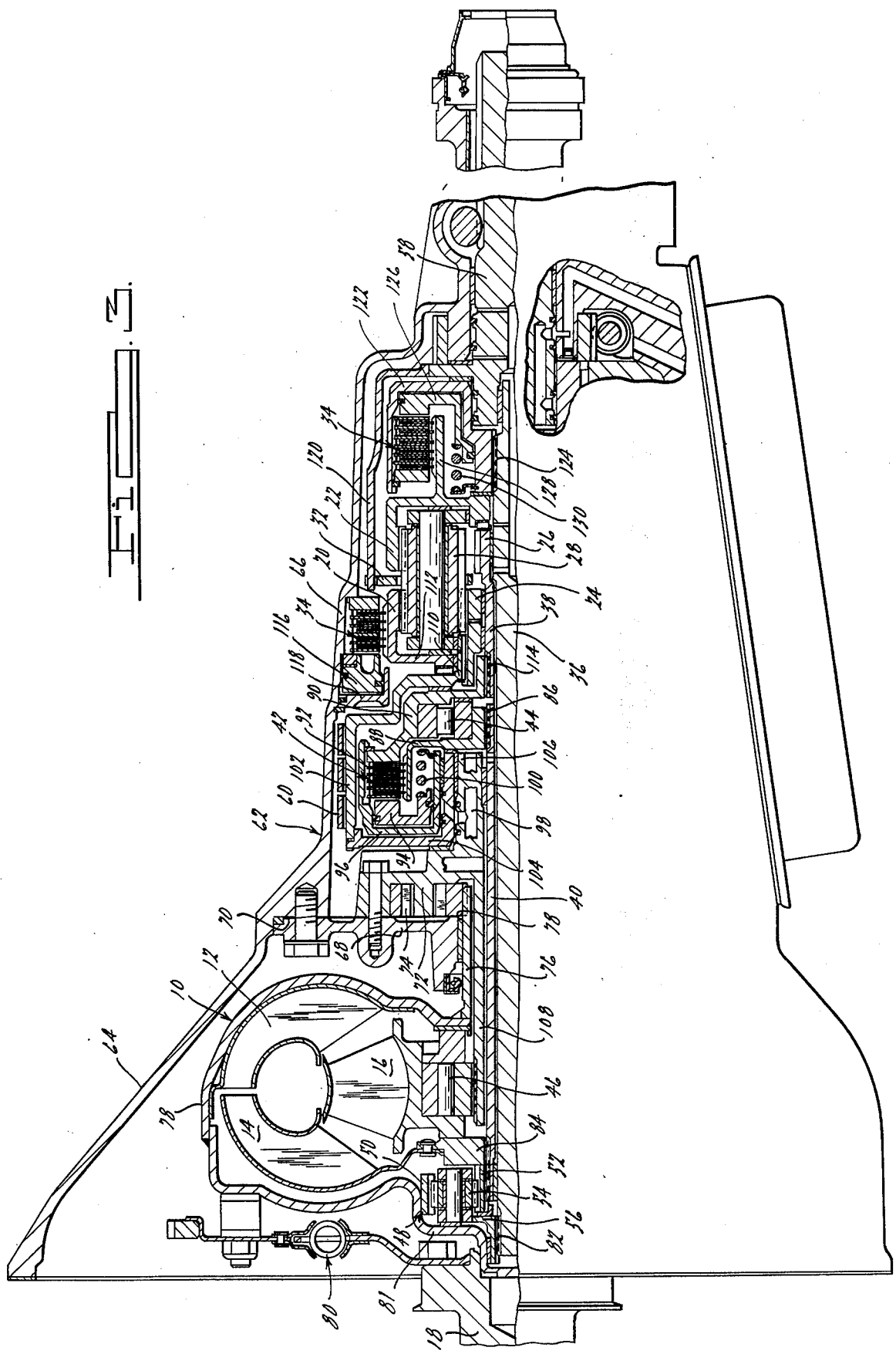

MULTIPLE RATIO HYDROKINETIC SPLIT TORQUE TRANSMISSION

GENERAL DESCRIPTION OF THE INVENTION

The improvements of my invention are adaptable for use in multiple ratio planetary gear transmission mechanisms for automotive vehicles. I am aware of several planetary gear transmission mechanisms used with hydrokinetic torque converters in automotive vehicle drivelines. For purposes of this disclosure I have disclosed two such planetary gear mechanisms. The teachings of my invention may be applied to a transmission system having two torque input gear elements that are adapted to be connected through clutches to a source of torque, such as the turbine of a hydrokinetic torque converter. The impeller of the converter is connected to the crankshaft of an internal combustion engine and the turbine is geared to one element of a split torque planetary gear unit. Another element of the split torque planetary gear element is connected to the crankshaft. A third planetary gear element is connected to the second torque delivery path.

There is no reaction gear element in the split torque gear unit, and thus it is ineffective to multiply torque. It is capable, however, of balancing torque delivered from the engine crankshaft to each of the two torque input gear elements during operation in the higher speed ratios. In a preferred embodiment of my invention, 33% of the engine torque is delivered hydrokinetically during second speed ratio operation and 67% is delivered mechanically. During operation in a third gear ratio, 16% of the torque is delivered hydrokinetically and 84% is delivered mechanically.

Although in some instances it might be possible to employ more than three forward driving speed ratios in a planetary gear system, the embodiments disclosed in this specification employ three forward driving speed ratios and a reverse ratio, the highest forward driving speed ratio being a direct-drive ratio.

The transmission mechanism of my invention is capable of providing improved vehicle driveline efficiency during operation in the higher speed ratios without sacrificing low drive range performance.

BRIEF DESCRIPTION OF THE FIGURES OF THE DRAWINGS

FIG. 1 shows in schematic form a hydrokinetic power transmission mechanism having the features of my invention;

FIG. 2 is a chart showing the clutch and brake engagement-and-release pattern for the transmission schematically illustrated in FIG. 1;

FIG. 3 is a longitudinal cross-sectional view of a transmission assembly of the type shown schematically in FIG. 1;

FIG. 4 is a schematic representation of a second embodiment of my invention.

FIG. 4A is a chart showing the clutch and brake engagement-and-release pattern for the embodiment of FIG. 4.

PARTICULAR DESCRIPTION OF THE INVENTION

Numeral 10 designates a hydrokinetic torque converter that includes an impeller 12, a turbine 14 and a bladed stator 16 situated in toroidal fluid-flow relationship. The impeller 12 is connected drivably to an engine crankshaft 18.

The transmission includes a planetary gear system having a pair of ring gears 20 and 22, a pair of sun gears 24 and 26, a set of long planet pinions 28, a set of short planet pinions 30 and a carrier 32 for journalling the pinions 28 and the pinions 30. Ring gear 22, sun gear 26 and pinions 28 and 30 comprise a compound planetary gear unit, the pinions 30 engaging sun gear 26, pinions 28 engaging ring gear 22 and the pinions 28 and 30 engaging each other. Long planet pinions 28 also mesh with ring gear 20 and sun gear 24 thereby comprising a simple planetary gear unit. Ring gear 20 is adapted to be braked by disc brake 34. Torque input shaft 36 and another torque input shaft 38 are connected to sun gear 26 and are adapted to be connected to turbine shaft 40 through selectively engageable clutch 42.

Overrunning clutch 44 is in parallel relationship with respect to the clutch 42. It is adapted to deliver torque in one direction during low speed ratio operation when turbine 14 is driving sun gear 26. Clutch 42 is effective during low speed ratio operation when coast braking is desired. Overrunning brake 46 anchors the stator 16 against rotation during torque multiplication but permits rotation of the stator in the direction of rotation of the impeller during coupling operation of the converter 10.

A simple planetary gear unit 48, which serves as a torque splitter or torque balance gear unit, includes a ring gear 50 which is connected to the impeller 12, a sun gear 52 which is connected to turbine shaft 40, planet pinions 54 which mesh drivably with ring gear 50 and sun gear 52, and carrier 56 which journal pinions 54.

Torque output shaft 58 is connected to the common carrier for the gear units in the planetary gearing. Sun gear 24 of the planetary gearing is adapted to be braked by friction brake 60 during operation in the first and second forward driving ratios.

FIG. 2 shows a clutch and brake engagement-and-release pattern. Brake 60 has been designated in FIG. 2 by the symbol B, clutch 42 has been designated by the symbol CL1, brake 34 has been designated by the symbol CL2, clutch 34 has been designated by the symbol CL3 and the overrunning clutch 44 has been designated by the symbol OWC. The ratios indicated in FIG. 2 are computed while assuming that the ring gear 50 has 60 teeth, sun gear 52 has 30 teeth, ring gears 20 and 22 have 73 teeth, sun gear 24 has 35 teeth and sun gear 26 has 25 teeth. In FIG. 2 hill braking operation in the low speed ratio drive condition is indicated by the symbol M. Normal operation from a standing start in the lowest speed ratio is designated by the symbol D.

In FIG. 3 the transmission housing has a unitary housing designated by reference character 62. It includes a bell housing portion 64 that surrounds the converter 10 and a transmission gear housing portion 66. A bearing support wall 68 is bolted to interior shoulder 70 of the housing 10. Pump housing 72 is bolted to the wall 68 and defines a housing for a positive displacement pump 74. Impeller support sleeve shaft 76 is journalled in the central opening 78 formed in the wall 68.

The impeller 12 includes a shell 78 that is connected drivably to crankshaft 18 through drive disc 80.

The ring gear 50 of the torque splitter unit 48 is carried by the turbine shell 81. Carrier 56 of the gear unit 48 is splined at 82 to the shaft 36. Sun gear 52 is splined to the forward end of sleeve shaft 40. Turbine hub 84 also is splined to the sleeve shaft 40.

The rearward end of the sleeve shaft 40 is splined at 86 to clutch element 88 for the friction clutch 42. A companion clutch element 90 is adapted to be connected to clutch element 80 through a multiple disc clutch assembly 92. The clutch assembly 42 is applied by an annular piston 94 situated in annular cylinder 96 which cooperate to define a pressure chamber. Internal passage structure shown in part at 98 controls distribution of pressure to the annular chamber for clutch assembly 42. Clutch return spring 100 disengages the clutch assembly 42 when the pressure in the annular chamber is exhausted. The outer race for the overrunning clutch 44 is secured fast to the clutch element 90 and the inner race thereof is secured fast to the clutch element 88. Overrunning clutch rollers are situated between the races to establish a one-way driving connection between the clutch elements.

A brake drum 102 for the friction brake 60 is supported by hub member 104, which is journalled on the stationary sleeve shaft extension 106 of the bearing support 72. Stator sleeve shaft 108 also is formed on the bearing support 72. This sleeve shaft anchors the inner race for the overrunning brake 46.

Brake drum 102 includes a drum hub 110 which is splined to the sun gear 24. A support 112 for ring gear 20 is situated adjacent the hub 110. Thrust washers are arranged between member 112, hub 110 and clutch element 90 to permit transfer of the axial thrust forces from one to the other. Clutch element 90 is splined at 114 to sun gear shaft 38. Ring gear 20 carries brake discs, which form a part of brake assembly 34. They register with brake discs carried by the housing 66. The discs are engaged by annular brake piston 116 situated in an annular chamber defined in part by housing 66 and annular servo member 118. Carrier 32 is connected to power output shaft 58 through a torque crossover member 120 which encloses a portion of the gearing and clutch assembly 34. Clutch drum 122 is splined at 124 to the shaft 36 and it defines an annular cylinder within which is situated annular clutch piston 126. Drum 122 carries clutch discs that register with clutch discs carried by clutch element 128 which forms a part of the ring gear 22. Clutch return spring 130 urges the piston 126 to a clutch release position. It is applied by fluid pressure admitted to the annular pressure chamber defined by the cylinder 122 and the piston 126.

During low speed ratio operation full turbine torque is delivered to the sun gear 26 through clutch 42 or clutch 44. Sun gear 24 is anchored to serve as a reaction point. A typical torque multiplication ratio that may be achieved under these conditions is 2.40, as indicated in FIG. 2 for the assumed gear sizes. Brake 60 still serves as a reaction member during second speed ratio operation. Torque is delivered to the ring gear 22, however, through the clutch 34 which becomes engaged. A split torque delivery thus is achieved through the planetary gear unit 48 with 33% of the torque being distributed through the converter and 67% being distributed mechanically from the crankshaft 18 and through the gear unit 48 to the carrier 56. To establish a ratio change to the high speed ratio, both clutches 34 and 42 are applied thereby locking together the elements of the gear system for rotation in unison. Again the torque split occurs through gear unit 48 with 16% of the torque being distributed hydrokinetically and the balance being distributed mechanically.

A second embodiment of the invention is shown in FIGS. 4 and 4A. In this embodiment the gear system shown at 132 has two input gear elements with separate torque input shafts. These are designated by the symbols 134 and 136. A hydrokinetic torque converter 138 is interposed between the engine crankshaft and intermediate shaft 142 which is connected to sun gear 144 of torque splitter planetary gear unit 146. Ring gear 148 of the gear unit 146 is connected to the engine crankshaft through a central shaft 150. Pinions 152 for the gear unit 146 engage ring gear 148 and the sun gear 142 and are journalled on carrier 150 for clutch 156, which connects the carrier 154 with input shaft 136 which in turn is drivably connected to carrier 158. Gearing 132 includes a ring gear 160. Sun gear 162, a second sun gear 164, a set of short planet pinions 166 which mesh with sun gear 164, a set of long planet pinions 168 which mesh with pinions 166, ring gear 160 and sun gear 162 and the carrier 158 which journal the pinions 166 and 168. Ring gear 160 is connected to power output shaft 172.

A friction clutch 174 is adapted to connect selectively the turbine shaft 142 with torque transfer member 176 which enclosed gear unit 146 and which is connected to input shaft 134. Clutch 174 is engaged during operation in the low speed range and direct-drive third speed ratio. An overrunning clutch 178 bypasses the clutch 174 when coast braking during operation in the low speed range is not desired.

Brake 180 is adapted to anchor the sun gear 164 during operation in the second speed ratio. A second friction brake 182 is adapted to anchor the carrier 158 during operation in the reverse drive range.

FIG. 4A shows a chart indicating the clutch and brake engagement and release pattern for the embodiment of FIG. 4. For purposes of this chart the brakes 180 and 182 have been identified by the symbols B1 and B2. The clutches 174 and 156 have been identified with symbols CL1 and CL2. The overrunning clutch 178 has been identified in FIG. 4A by the symbol OWC. The ratios that are computed in FIG. 4A are those that exist when the ring gear 148 has 57 teeth, sun gear 144 has 27 teeth, ring gear 160 has 72 teeth, sun gear 164 has 30 teeth and sun gear 162 has 36 teeth. Corresponding gear sizes are assumed in the computations shown in FIG. 2.

As in the first embodiment, the embodiment of FIG. 4 provides a fully hydrokinetic torque delivery path during operation in the low speed range. It is possible to change the input torque path to achieve a shift from the lowest ratio to the second speed ratio. This switch from one input element to another is accomplished by engaging clutch 156 and disengaging clutch 174. In other words the input gear elements are traded, one operating in the lowest ratio and the other operating in the second ratio. High ratio operation is achieved by engaging both clutches 174 and 156 simultaneously thereby effecting a one-to-one lockup condition with a portion of the torque being distributed hydrokinetically and the balance being distributed mechanically through the shafts 142 and 150, respectively.

Having thus described preferred embodiments of my invention, what I claim and desire to secure by U.S. Letters Patent is:

1. A multiple ratio hydrokinetic transmission mechanism comprising a planetary gear system having two torque input gear elements, a torque output element and a reaction element, brake means for anchoring the reaction element to effect forward drive operation in a first and second forward drive ratio, a hydrokinetic unit comprising an impeller and a turbine, the impeller being connected to a source of torque, a turbine shaft and a torque splitter planetary gear unit having an input element connected to a source of torque, a second element connected to the turbine shaft and a third element cooperating with the first and second elements to effect a torque balance, first clutch means for connecting the turbine shaft to a first of said torque input gear elements of said planetary gear system and second clutch means for selectively connecting said third element of said torque splitter gear unit to the said second of said torque input gear elements.

2. The combination as set forth in claim 1 wherein said planetary gear system comprises two sun gears, two ring gears, a set of short planet gear elements, a set of long planet gear elements, said planet gear elements engaging each other, the long planet gear elements engaging said ring gears, the short planet gear elements engaging the first of said sun gears, the second of said sun gears engaging said long planet gear elements.

3. The combination as set forth in claim 1 wherein said planetary gear system comprises two sun gears, a driven shaft, a single ring gear, a first set of long planet gear elements, a second set of short planet gear elements, said gear elements having a common carrier, one sun gear being a first torque input element, said carrier being a second torque input element, the ring gear being connected to said driven shaft, the long planet gear elements engaging said ring gear and one of said sun gears, the short planet gear elements engaging the other sun gear, said long and short planet gear elements engaging each other.

4. The combination as set forth in claim 1 wherein said first clutch means comprises a first friction clutch selectively engageable to establish a driving connection between said turbine and a first of said torque gear elements and an overrunning clutch for establishing a driving connection in parallel relationship with respect to said friction clutch for torque delivery in one direction.

5. A multiple ratio power transmission mechanism having a planetary gear system, said gear system having two torque input gear elements, a simple planetary gear unit having cooperating first, second and third planetary elements, a hydrokinetic unit comprising a turbine and an impeller situated in toroidal fluid flow relationship, said impeller being connected to a source of torque, an output element of said gear system being connected to a driven shaft, means for braking a reaction element of said gear system during operation in low speed ratio and in intermediate speed ratio, one element of said simple planetary gear unit being connected to said source of torque, and clutch means for connecting another element of said simple planetary gear unit to a first of said torque input gear elements, a third element of said planetary gear unit being connected to said turbine and second clutch means for connecting said torque turbine to a second of said input gear elements.

6. The combination as set forth in claim 5 wherein said planetary gear system comprises two sun gears, two ring gears, a set of short planet gear elements, a set of long planet gear elements, said planet gear elements engaging each other, the long planet gear elements engaging said ring gears, the short planet gear elements engaging the first of said sun gears, the second of said sun gears engaging said long planet gear elements.

7. The combination as set forth in claim 5 wherein said planetary gear system comprises two sun gears, a single ring gear, a first set of long planet gear elements, a second set of short planet gear elements, said gear elements having a common carrier, one sun gear being a first torque input element, said carrier being a second torque input element, the ring gear being connected to said driven shaft, the long planet gear elements engaging said ring gear and one of said sun gears, the short planet gear elements engaging the other sun gear, said long and short planet gear elements engaging each other.

8. The combination as set forth in claim 5 wherein said first clutch means comprises a first friction clutch selectively engageable to establish a driving connection between said turbine and a first of said torque input gear elements and an overrunning clutch for establishing a driving connection in parallel relationship with respect to said clutch means for torque delivery in one direction.

* * * * *